Figure 1:
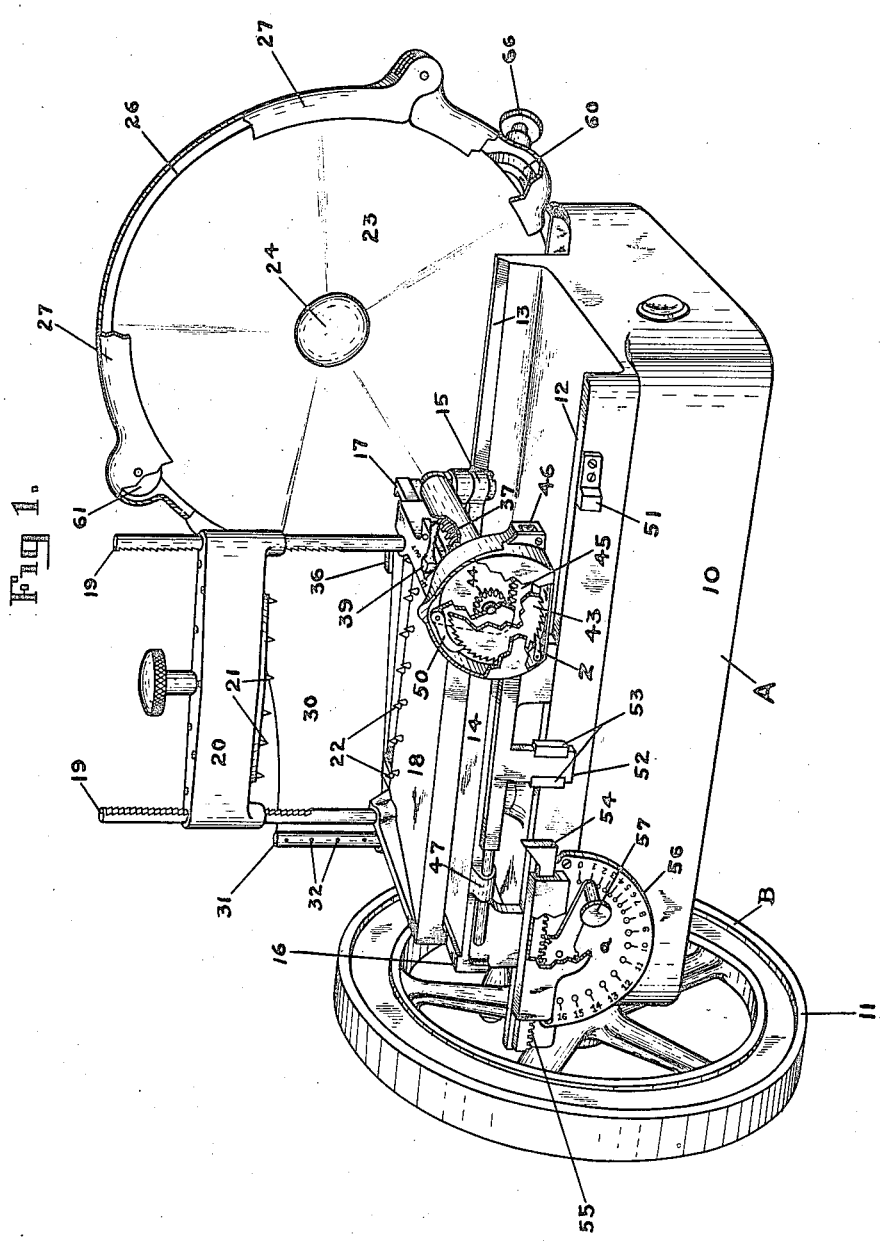

J. HOPKINSON & C. H. MALTBY.
MEAT SLICING MACHINE.
APPLICATION FILED AUG. 6, 1915.

1,210,476.

Patented Jan. 2, 1917.
3 SHEETS—SHEET 1.

Attest.
Joseph Wales,
H. Leonard

Inventors
Joseph Hopkinson
Clinton Holt Maltby
Kerr Page Cooper + Hayward
attys

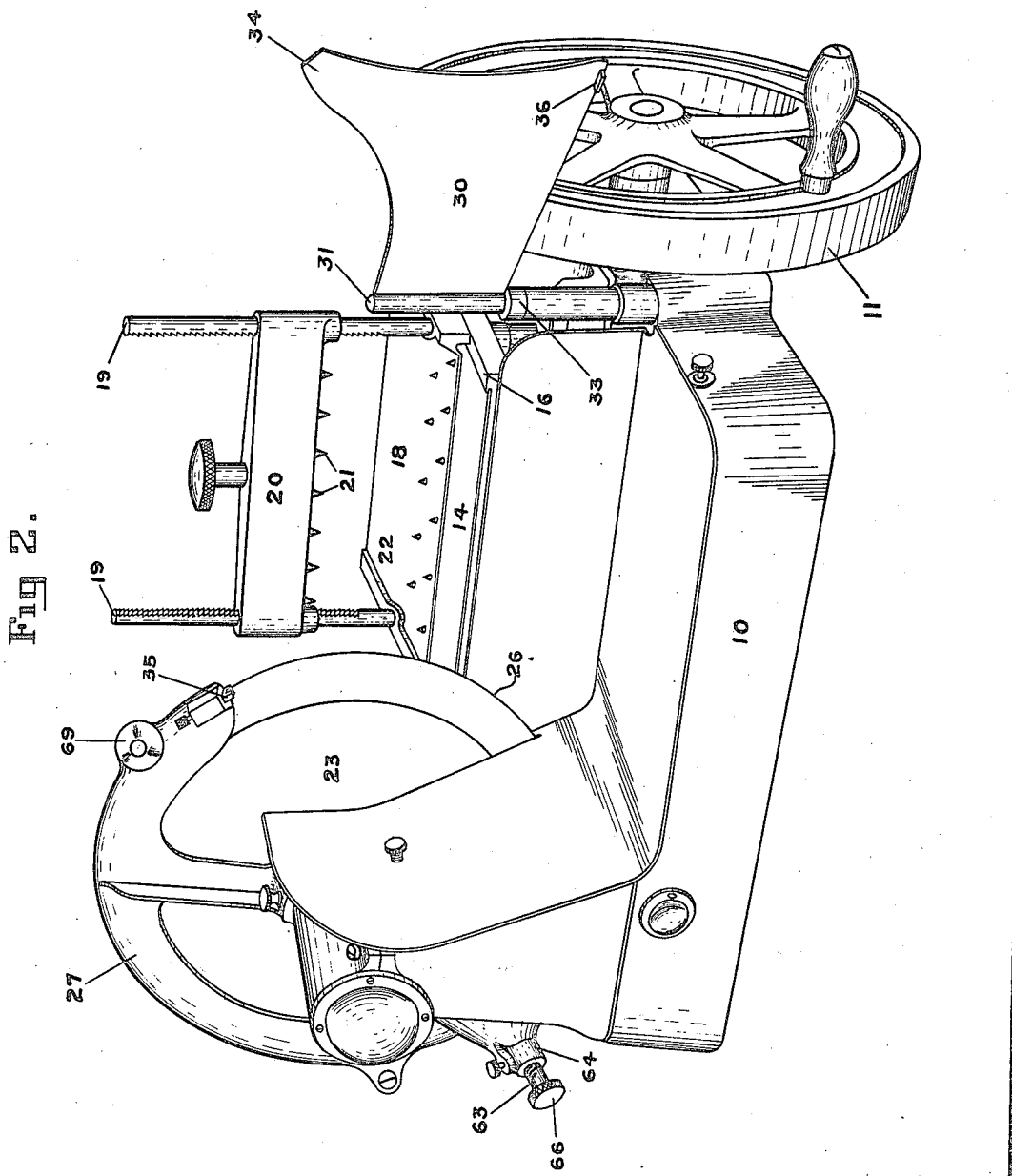

J. HOPKINSON & C. H. MALTBY.
MEAT SLICING MACHINE.
APPLICATION FILED AUG. 6, 1915.
1,210,476.
Patented Jan. 2, 1917.
3 SHEETS—SHEET 3.
Fig 4.
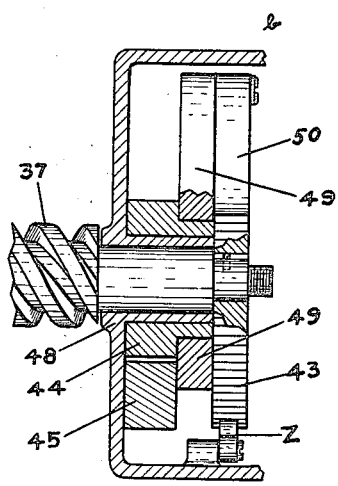
Fig 3.
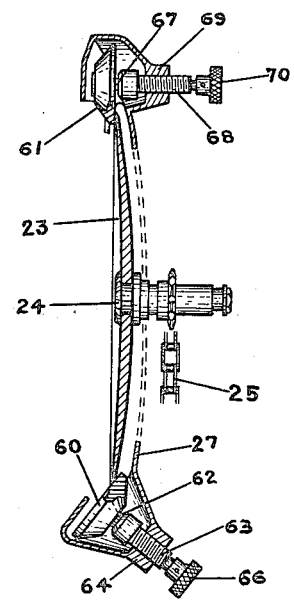
Fig 5.
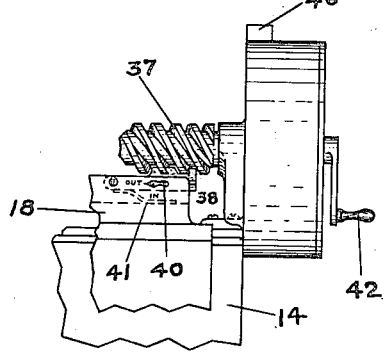
Fig 7.
Fig 6.
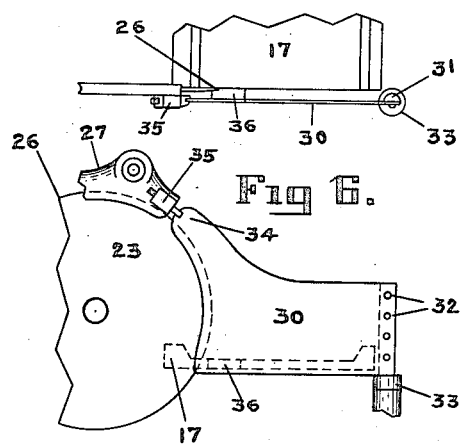
Attest.
Joseph Wales.
H. Leonard.
Inventors
Joseph Hopkinson
Clinton Holt Maltby
Kerr Page Cooper & Hayward
attys

UNITED STATES PATENT OFFICE.

JOSEPH HOPKINSON AND CLINTON HOLT MALTBY, OF DAYTON, OHIO, ASSIGNORS TO THE COMPUTING SCALE COMPANY, OF DAYTON, OHIO, A CORPORATION OF OHIO.

MEAT-SLICING MACHINE.

1,210,476.  Specification of Letters Patent.  Patented Jan. 2, 1917.

Application filed August 6, 1915. Serial No. 43,913.

*To all whom it may concern:*

Be it known that we, JOSEPH HOPKINSON and CLINTON HOLT MALTBY, citizens of the United States, both residing at Dayton, Montgomery county, and State of Ohio, have invented certain new and useful Improvements in Meat-Slicing Machines, of which the following is a full, clear, and exact description.

This invention relates to certain new and useful improvements in meat slicing machines of the type shown in patents to Brinnhauser, 853,254, Burkhardt, 857,155 and Van Berkel Reissue 13,180.

One of the objects of our invention consists in an improved guard for the rotating knife. This guard prevents accidents to the operator and others who may pass the machine, and also has portions projecting therefrom, which serve as a support for the slices of meat before they have been cut by the knife.

Another object of our invention relates to certain improvements in the grinding mechanism for the circular concavo-convex knife. Our improved grinding mechanism permits the knife to be sharpened without interfering with the regular operation of the machine.

Another feature of our improved grinding mechanism consists in a grinder to remove the bur from the convex side of the knife after the said knife has been sharpened.

In the drawings: Figure 1 is a perspective view of the complete meat slicer. Certain portions of the housing are broken away to show the details of the feeding mechanism. Fig. 2 is a perspective view of the opposite side of the machine and shows the knife guard swung back for cleaning. Fig. 3 is a detail view of the knife grinding device. The knife is shown in a transverse central section. Fig. 4 is a detail cross sectional view of the feeding device for the meat plate. Fig. 5 is another detail view of the feeding device for the meat plate. Figs. 6 and 7 are detail views showing the knife guard. Fig. 6 shows a rear view similar to Fig. 2, but with the guard in place. Fig. 7 shows a top plan view of Fig. 6.

In more detail, in Figs. 1 and 2, 10 is the base of the machine and 11 a fly wheel which is mounted on the end of the driving shaft which is journaled within the base. The upper face of the base is provided with two guide rails 12 and 13 upon which is slidably mounted a meat plate table 14. This meat plate table is given a back and forth reciprocating motion along the guide rails 12 and 13 by means of the connecting rod 15 which connects at one end with the table and at its opposite end with a crank pin driven by the drive shaft of the machine. This reciprocating drive of the meat plate table is a form well known and shown in the patents heretofore mentioned. The meat plate table has transverse guiding rails 16 and 17, which slidably support a meat plate 18. These supports permit the meat plate to slide freely in transverse direction with respect to the direction of reciprocation of the meat plate table 14. Extending upwardly from the meat plate 18 are two meat clamp posts 19. These posts are adapted to receive a meat clamp 20 which has projections 21 on its lower face which coöperate with similar projections 22 on the meat plate to aid in clamping the meat securely between the meat clamp 20 and the meat plate 18. A circular knife 23 which is concavo convex in form is mounted on a shaft 24 which shaft is suitably mounted on the base and which is driven at a high speed by the driving shaft of the machine in any well known manner, preferably by means of the chain 25 shown in Fig. 3. The periphery 26 of the knife 23 is guarded at its upper portion by a solid fixed guard 27 which is suitably secured to the base of the machine. This guard is spaced slightly from the periphery of the knife and is provided with wing portions which extend toward the center of the knife, (see Figs. 1, 2 and 3).

*Combined knife guard and meat shield.*— Heretofore in meat slicing machines it has been the practice to guard the cutting portion of the knife by bent wire guards which are spaced slightly away from the periphery of the knife. In some cases even these guards have been omitted. This form of guard, although effective to a certain extent, does not prevent injuries to the operator when he advances his hand at a slight angle to the plane of the cutting edge of the knife, since by doing so he would entirely avoid the wire guard. We have found by making the guard in the form of a broad plate that the knife is effectively guarded since some portion of the plate will contact with the hand of the operator and prevent him from further advancing his hand to the periphery of the rotating knife. This plate guard also is well adapted to carry a lug which supports the projecting end of the meat.

Our improved form of meat guard is shown in Figs. 1, 2, 6 and 7 and consists of a vertical plate 30. The plate is supported at a point remote from the circular knife by means of a post 31. The plate, which is flattened on one side, is fastened to the flat side of the post 31 by screws 32. The post is pivotally mounted in a bearing 33 which is secured to the frame of the machine. The plate extends forwardly from the post and this forwardly extending portion is parallel with the edge of the meat plate 18, as shown in Fig. 7. The lower edge of the plate extends below the top of the meat plate and the plate is spaced slightly from the meat plate. The top of the guard plate is sloped gradually upward and finally terminates in a nose portion 34, which has the function of guarding the edge of the knife and also serving as an extension of the guard plate to engage with the spring catch 35. This spring catch is mounted on the fixed guard, and when engaged holds the plate guard in the proper position for guarding the cutting portion of the circular knife. The catch also keeps the mid portion of the guard in proper alinement so that certain portions of the guard can form a meat support as will hereafter be explained. When the catch 35 is disengaged the guard plate can be swung around on its pivoted support 31—33 and be cleaned. This pivotal mounting of the guard plate also gives access to the knife when it is desired to clean or inspect the same. From the figures, particularly Figs. 6 and 7, it is clear that the guard plate is spaced slightly from the periphery of the knife in a lateral direction and that the guard plate terminates in a circular edge which is slightly within the periphery of the knife. This arrangement allows the slice of meat to pass between the knife and the guard plate. To support the overhanging edge of the piece of meat during and after the slicing operation, we provide a meat slice support which consists of lug 36, which is integral with the guard plate and which extends slightly toward the meat plate 18 (see Figs. 1, 2 and 7).

*Meat plate transverse feeding mechanism.*—As previously explained, the meat plate is adapted to be moved transversely with respect to the direction of reciprocation of the meat plate table. This transverse movement of the plate is utilized to advance the meat for each slicing operation. In order that uniform thicknesses of meat may be sliced, we provide a feeding mechanism to advance the meat plate by uniform increments. It is also necessary to vary the increment of feed since it is desirable to have machines which can cut slices of varying thicknesses. It is also desirable that the mechanism for controlling the thickness of slices be so constructed that the adjustment can be changed while the machine is in operation. To these ends we provide a feeding mechanism which is carried on the meat plate table. The said table also carries a member which is adapted to be moved relatively to the table and thus operate the feeding mechanism. This member is arrested by stops, and by varying the point at which the member is arrested the increment of feed may be varied at will.

The mechanism is shown in Figs. 1, 4 and 5. In Fig. 5 the meat plate 18 is adapted to be moved transversely by a feed screw 37 which engages a threaded block 38, carried by the table. The threaded block 38 is normally held in engagement with the feed screw 37 by a spring 41 but when it is desired to slide the table 18 by hand the handle 39 shown in Fig. 1 is turned to the out position. This handle engages a slot 40 in the threaded block 38 and in this way moves the block 38 into or out of engagement with the feed screw 37. For moving the meat plate back and forth when desired, we provide a handle 42 which is secured to the end of the feed screw 37. See Figs. 4 and 5. The feed screw 37 has rigidly fastened to its end a ratchet wheel 43. A rack 45 is mounted in guides 46 and 47 at the side of the meat plate table 14. The rack teeth are adapted to mesh with a pinion 44 which pinion is revolubly mounted on a sleeve 48 which forms the bearing for one end of the feed screw. The pinion 44 is rigidly secured to a pawl arm 49. This pawl arm at its extremity carries a pawl 50 which is adapted to engage with the teeth of the ratchet wheel 43. It will be seen on moving the rack back and forth that the ratchet wheel will be given a step by step motion and this movement will be transmitted to the feed screw and will move the meat plate transversely. The rack 45 is free to move through the guides 46 and 47 in a direction parallel with the line of motion of the meat table. Normally the rack moves in unison with the meat table and imparts no motion to the ratchet wheel. To impart a relative motion to the rack with respect to the meat table we provide a lug 51 on the base of the machine. This lug is adapted to contact with a downwardly extending lug 52 on the rack and arrest the rack as the meat table advances. The lug is provided with felt cushion blocks 53 to prevent noise and reduce the shock of contact of lug 51 and lug 52. This causes relative movement of the rack with respect to the meat table and through the pinion and pawl arm moves the pawl idly over the teeth of the ratchet wheel to restore the parts. For arresting the feed rack on the opposite movement of the meat table and to thus actuate the ratchet wheel 43 and feed the meat plate 18 transversely we provide an adjustable plunger 54. This plunger is in alinement with the downwardly extending lug 52 on the feeding rack and is so positioned that upon the rearward movement of the feed rack it contacts with the downwardly extending lug and arrests the rack and moves it relatively to the meat plate table.

It will be seen that by varying the position of the plunger the lug 52 on the rack 45 will contact sooner or later with the plunger and the increment of cross feed will be varied. The position of the plunger is varied by providing rack teeth 55 on the plunger. Pivotally mounted upon a graduated index plate 56 which is secured to the frame of the machine, is an index lever 57 which has a hub with gear teeth cut thereon adapted to mesh with the rack teeth 55 on the plunger 54. The index lever has a handle which is provided with a plunger which is adapted to enter the numbered holes on the graduated index plate. These holes are suitably spaced for different setting of the plunger.

From the above it will be seen that a mechanism is provided which permits a wide variation in the thickness of slices of the meat and at the same time permits the thickness of the slices to be changed when the machine is in operation since all control handles are fixed on permanent parts of the machine.

*Knife grinding devices.*—In Fig. 3 the knife grinding devices are shown. The circular knife 23 is partially surrounded by the fixed guard 27. This fixed guard is also adapted to form the support for the grinding devices. There are two of these grinding devices. The grinding devices comprise the two abrasive wheels 60 and 61. The wheel 60 sharpens the knife on the convex side and the wheel 61 removes the bur from the concave side of the knife. Wheel 60 is revolubly mounted on a spindle 62. This spindle is screw threaded at 63 and these threads engage threads in the portion 64 of the fixing housing. The threaded spindle 62 is angularly mounted in portion 64 of the housing and by turning the knurled knob 66 which is rigidly secured to the end of the spindle the abrasive wheel can be advanced to or retracted from contact with the convex side of knife 23. When in contact on rotating the knife the knife will be sharpened to an angle edge. The abrasive wheel 61 is similarly mounted on spindle 67 which spindle is screw threaded at 68 and adapted to engage threads in a portion 69 of the fixed housing. The spindle also carries the knurled knob 70. The axis of spindle 67 extends in the housing in a direction parallel to shaft 24. The abrasive wheel 61 is on the concave side of the knife 23 and by turning the knurled knob 70 the wheel can be advanced to grind the bur from the concave side of the knife.

It will be understood that we do not limit our invention to the precise form shown and described in the drawings and described in the specification.

What we claim as our invention is more particularly pointed out in the appended claims.

We claim:

1. In a device of the class described comprising in combination, a circular revoluble knife, a base having extending portions to support the knife, a post extending upward from the base and extending in a line perpendicular to a plane passing through the axis of the knife, a guard for the knife secured to the base and a plate guard mounted upon the post and extending to a point slightly behind and to one side of the cutting edge of the knife, said guard being adapted to swing about said post as an axis, and means for detachably securing the plate guard rigidly in said position and thereby preventing the swinging of the guard about its pivot.

2. In a meat slicer, in combination, a circular revoluble knife, a base supporting said knife and having extending portions to guard the knife, a post extending upward from the base in a direction perpendicular to a plane passing through the axis of the knife, and revolubly mouned in a bearing in said base, a plate guard rigidly secured to the post and adapted to swing therewith about the bearing in the base, said plate guard extending to a point slightly in the rear and to the side of the cutting edge of the knife and a spring catch for holding said guard in position to guard the knife and permitting the guard to be swung back at will for cleaning.

3. In a device of the class described, in combination a base, a revolubly mounted circular knife, a housing supported on the base and partially surrounding the periphery of the knife, a plate pivotally mounted on the base and extending upward to a point adjacent the housing, said plate having a lug thereon forming a meat support and coöperating with the housing to form a guard for the knife.

4. In a device of the class described, in combination, a circular rotating knife, a plate extending in a direction perpendicular to the axis of and terminating at one end within the periphery of the knife, said plate being also spaced laterally with respect to the knife, whereby said knife is guarded, a pivotal support for said plate remote from the knife whereby said plate may be swung back and the knife be exposed for cleaning, a meat plate adapted to advance meat to be engaged by the knife, and a lug on the beforementioned plate extending toward the meat plate and adapted to extend under the edge of the meat to coöperate with the meat plate and support the meat during the slicing operation.

5. In a meat slicer, in combination a circular rotating knife, a housing partially surrounding the periphery of the knife and forming a guard therefor, a plate extending in a direction perpendicular to the axis and past the cutting periphery and terminating at one end within the periphery of the knife, said plate being also spaced laterally with respect to the knife and a pivoted support for the plate remote from the knife, said pivotal support extending substantially vertically and substantially parallel with the plane of the knife, whereby the said plate may be swung sidewise and the knife and the plate be exposed for cleaning, the said plate being adapted to form a guard for the periphery of the knife unguarded by the housing.

6. In a meat slicer, in combination a base; a circular rotating knife; a housing attached to the extensions from the base and partially surrounding and guarding the periphery of the knife; a vertically extending pivot mounting associated with the base and without the periphery of the knife, a plate extending from said pivot mounting in a direction perpendicular to the axis of the knife and past the cutting periphery of the knife and terminating slightly within the said periphery, the said plate coöperating with the housing to complete the guarding of the knife and said pivot mounting permitting the said plate to be swung sidewise with respect to the knife for cleaning the plate and the knife.

7. In a meat slicer, in combination a base; a circular rotating knife; a housing partially surrounding and guarding the periphery of the knife, a plate parallel with the plane of the knife, spaced slightly laterally therefrom and terminating within the periphery of the knife, a vertically extending pivot mounting associated with the base without the periphery of the knife, said plate being connected with said pivot whereby the plate may be swung sidewise for cleaning the knife and the plate, and a nose integral with the plate and extending to the end of the housing, said plate and nose portion being adapted to guard the portions of the periphery of the knife left unguarded by the housing.

8. In a meat slicer, in combination, a knife, a housing partially surrounding the periphery of the knife, a meat plate adapted to advance meat to the knife, a guard plate adjacent the meat plate and extending toward and detachably connecting with the said housing to complete the guarding of the knife and an abutment on the last mentioned plate which extends toward the meat plate to form a support for the slice of meat while being cut by the knife, the portions of said plate opposite the meat plate being adapted to act as a guide for the slices of meat.

9. In a meat slicer, in combination, a circular rotating knife, a plate extending in a direction perpendicular to the axis and past the cutting periphery of the knife and terminating at one end within the periphery of the knife, said plate being also spaced laterally with respect to the knife whereby said knife is guarded, a pivotal support for said plate remote from the knife, said pivotal support being substantially in alinement with the plane of the plate whereby said plate may be swung sidewise and the knife and the plate be exposed for cleaning.

10. In a meat slicer, a circular rotating knife, a meat plate adapted to advance meat to the knife, in combination with a plate pivoted at a point remote from the knife and extending past and to a point within the cutting portion of the periphery of the knife and an abutment on said plate extending toward the meat plate and thereby forming a support for the slice of meat while being cut by the knife, the aforesaid pivotal mounting of the plate permitting said plate to be swung back for cleaning the plate and the abutment thereon.

11. In a device of the class described, in combination, a base, a circular rotating knife, a housing secured to the base and partially surrounding the periphery of the knife; a plate, parallel with the plane of the knife and spaced slightly therefrom, pivotally mounted upon the base to swing sidewise with respect to the plane of the knife; a nose integral with the plate and extending toward the housing; and a spring catch on the housing to secure the nose of the plate to the housing in position to act as a guard for the knife.

12. In a device of the class described, in combination, a circular rotating knife; a housing therefor partially surrounding the periphery of the knife and forming a guard therefor; a plurality of pockets in said housing having walls integral with the walls of the housing, spindles secured to said walls; rotatable knife grinders rotatably mounted on said spindles, the said pockets forming a guard for the revoluble grinders; and a plate coöperating with the housing and detachably secured thereto to guard the knife at the points of the periphery not covered by the aforesaid housing.

13. In a device of the class described, in combination, a circular rotating knife, a housing therefor partially surrounding the periphery of the knife and forming a guard therefor, said guard having an enlarged pocket portion, the walls of said pocket portion being integral with the walls of the housing and a grinder device carried by a support extending from, supported by, and within the said walls of the pocket portion, said grinder being adapted to sharpen the knife and the said pocket portions being adapted to guard the said grinder.

14. In a device of the class described, in combination, a concave convex circular knife; a housing adapted to partially surround and guard the edge of the knife; a grinding device carried by a support extending from and within the housing and adjustable to and from the circular knife; and a second grinding device carried by a support extending from and within the housing, and adjustable to and from the circular knife and adapted to remove the bur from the concave edge of the knife.

15. In a meat slicer having a base to support the operating parts of a machine, the combination of a revoluble knife, a housing therefor secured to the base and partially surrounding the periphery of the knife and forming a guard therefor; and a plurality of substantially conically shaped pockets integral with the said housing, certain of the walls of the said pockets having provisions thereon to support revoluble grinding devices within the said pockets.

16. In a meat slicer, in combination, a base; a revoluble concave convex circular knife, a housing secured to the base and partially surrounding and guarding the periphery of the knife; a plurality of substantially conically shaped pockets in said housing having walls coextensive with the walls of the housing, one of the walls of each of said pockets being adapted to adjustably support a spindle forming a grinder support; a plurality of grinders located within the said pockets and revolubly supported on said spindles, said grinders having a fixed angular position on said spindles and being adapted to be advanced or retracted by the advancement or retraction of the spindles in the said pocket walls.

17. In a device of the class described in combination; a revoluble concave convex circular knife; a housing adapted to partially surround and guard the edge of the knife; a revolubly mounted grinding wheel for the concave side of the knife, said wheel having a spindle which is mounted in, carried by and laterally adjustable in the housing whereby the wheel may be advanced to remove the bur from the edge of the knife; a second revolubly mounted grinding wheel for the convex side of the knife, said wheel having a spindle which is angularly mounted in, carried by and adjustable in the direction of its mounting to sharpen the convex side of the knife.

18. In a device of the class described a concave convex circular knife, a housing partially surrounding and guarding the periphery of the knife, a plurality of grinding wheels for the said knife, a plurality of spindles for the said wheels, said spindles being mounted in and carried by the said housing and adapted to be advanced or retracted to advance or retract the grinding wheels into or out of contact with the knife.

19. In a device of the class described in combination, a concave convex circular knife; a housing partially surrounding and forming a guard for the knife; a plurality of grinding wheels to sharpen the edges of the knife; a plurality of screw threaded apertures in the housing and a plurality of screw threaded spindles carrying thereon the said grinding devices, said spindles being adjustably supported in the screw threaded apertures in the housing.

In testimony whereof we hereunto affix our signatures.

JOSEPH HOPKINSON.
CLINTON HOLT MALTBY.